A. W. WASHBURN & C. D. KEELER.
VOCAL AUTOMOBILE SIGNAL.
APPLICATION FILED MAR. 7, 1911.
1,177,978.
Patented Apr. 4, 1916.
2 SHEETS—SHEET 1.
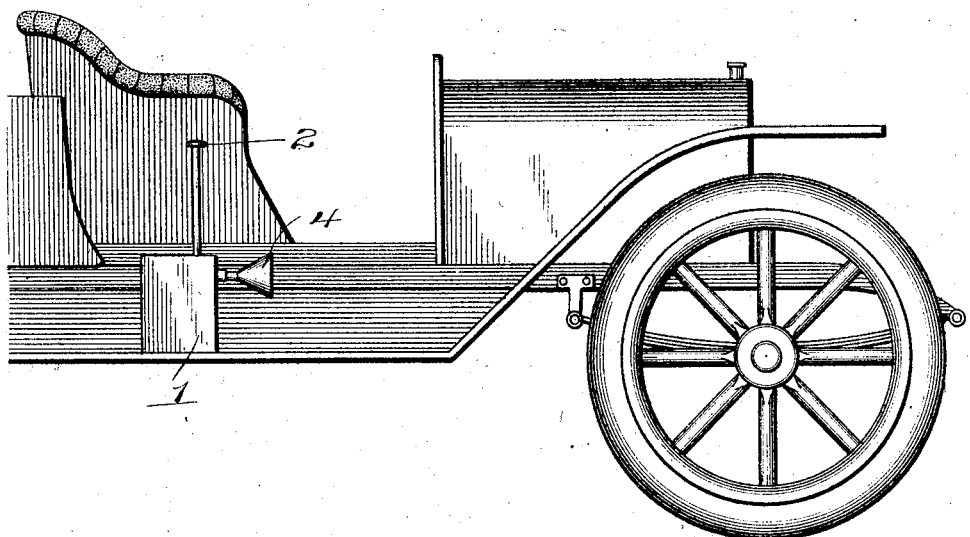
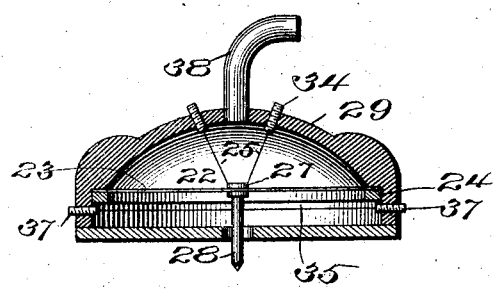
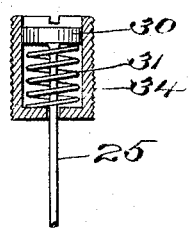
Witnesses
J. M. Fowler Jr
Charles N. Murray.
Inventors
Arthur W. Washburn
Charles D. Keeler
By Eugene E. Brown
Attorney

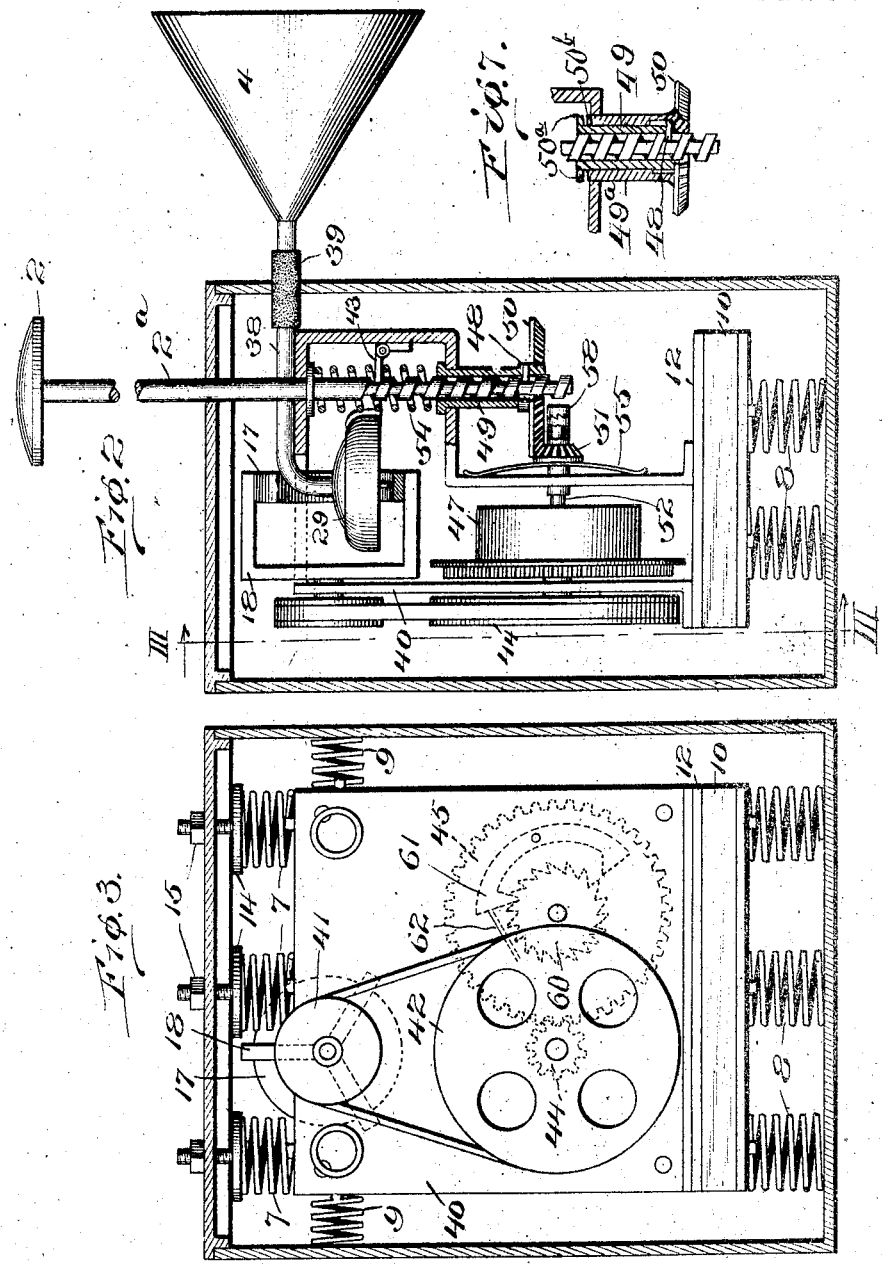

UNITED STATES PATENT OFFICE.

ARTHUR W. WASHBURN, OF MEMPHIS, TENNESSEE, AND CHARLES D. KEELER, OF PERTHSHIRE, MISSISSIPPI; SAID WASHBURN ASSIGNOR TO SAID KEELER.

VOCAL AUTOMOBILE-SIGNAL.

1,177,978.     Specification of Letters Patent.     Patented Apr. 4, 1916.

Application filed March 7, 1911. Serial No. 612,745.

*To all whom it may concern:*

Be it known that we, ARTHUR W. WASHBURN and CHARLES D. KEELER, citizens of the United States, residing, respectively, at Memphis, in the county of Shelby and State of Tennessee, and at Perthshire, in the county of Bolivar and State of Mississippi, have invented new and useful Improvements in Vocal Automobile-Signals, of which the following is a specification.

Our invention relates to apparatus for producing audible signals and especially designed to be mounted upon automobiles.

Various devices are in common use such as horns, gongs and whistles for the purpose of giving a warning note or signal to announce the approach of a vehicle. Some of these are musical and others are decidedly discordant, while many are shrill or startling and cause much annoyance to all but the occupants of the vehicle. These sounds are meaningless and serve merely as warning noises.

Our invention provides a signal which may not only be of any desired character, from a musical standpoint, but conveys an inherent meaning in the vocal warning of danger transmitted or spoken, thus performing a function which cannot be embodied in a mere audible signal.

Our invention will be clearly understood from the following description in connection with the accompanying drawings in which—

Figure 1, is a side elevation of the forward portion of an automobile showing our audible signal apparatus mounted upon the running board; Fig. 2, is a side elevation of the apparatus with the side of the containing case removed; Fig. 3, is a vertical section on the line III—III of Fig. 2; Fig. 4, is a vertical section of the phonographic reproducer; Figs. 5 and 6, are enlarged detail sectional views of the tensioning screws of the reproducer; and Fig. 7, is a sectional view of a modified form of a portion of the winding mechanism.

The casing of the signal apparatus may be mounted upon the running board of an automobile where the handle 2 will be within convenient reach of the hand or foot of the chauffeur or other occupant. The warning signal issues from the horn or trumpet 4, which is connected with the reproducer.

It is essential that the phonographic apparatus should be shielded from the jars and vibrations of the automobile body and we, therefore, provide means for abolishing all shocks by mounting the apparatus within the casing between cushioning devices. Springs 7 and 8, absorb the vibrations in a vertical direction while springs 9 prevent lateral vibrations. To further insure an absence of vibration in the reproducer, we may insert a pneumatic cushion 10, between the base or platform 12, and the lower springs. To provide for the accurate adjustment of the tension of the cushioning devices, the upper springs bear against plates 14, which may be raised or lowered by means of nuts 15.

The actuating record is preferably carried upon the inside of a record cylinder 17, mounted in a rotary spider 18, which may be rotated by any suitable motor device. Inasmuch as the same signal is constantly repeated, the needle 20 of the reproducer follows the same actuating indentations of the record and there is no relative longitudinal movement between the record cylinder and the needle, so that the necessity for the usual feed mechanism is obviated. By causing the needle to traverse a concave record upon the inner surface of a cylinder instead of a convex outer surface, it will be apparent that the needle will come more perfectly into contact with the indentations and will be caused to vibrate with greater force which will produce a greater volume and more distinctness of sound. It is obvious, however, that we may employ a cylinder carrying the record upon the outer surface.

The reproducer is illustrated in detail in Fig. 4. The upper wall of the reproducer or diaphragm chamber 22, is semi-elliptical which is better adapted than a semi-circular form to the production and propagation of the acoustical or sound waves. The diaphragm 23, is held by the clamping ring 24. For the purpose of adjusting the tension upon the diaphragm to tune it to the voice making the record and to vary the amplitude of vibration to produce the maximum effect of sound and clearness, tension wires 25 are attached to the central cap 27, by which the needle 28 is secured to the diaphragm. If the tension wires were rigidly attached to the shell 29, of the reproducer the diaphragm would be deprived of that flexibility or resilience so necessary for the propagation of vocal waves; and accordingly we secure the end of each wire 25, to a washer 30, bearing upon a spring 31, within a hollow screw 34. It will be seen that while the tension upon the diaphragm may be altered by means of the screws 34, the springs 31 will always insure the necessary flexibility and resiliency.

To further enhance the efficiency of our reproducer we augment the vibrations of the diaphragm by means of sonorous wires 35, preferably two, stretched below the diaphragm between the opposite walls of the reproducer. The ends of the wires pass through openings in adjusting screws 37 and are headed or upset against the outer ends thereof so that the screws can be turned without twisting the wires. Now by means of the adjusting screws 34 and 37, the diaphragm and sonorous wires 35, can be tuned to vibrate in harmony or synchronism. The rhythm of vibrations between diaphragm and sonorous wires results in augmenting the natural vibrations produced by the needle and adding greatly, not only to the volume of sound, but also to the clearness and distinctness of the vocal expressions.

The tracing point of the needle may be made of a filament of glass pressed into the end of the needle. The sound is conveyed through the tube 38, to the horn 4, and in order that any jar or vibrations from the horn, may not be transmitted to the tube, a section of rubber tubing 39 is interposed. The sound box may be supported by a hinged bracket 43 attached to the frame.

We have shown for purposes of illustration a spring-motor device to rotate the record cylinder, although it is obvious that an electric motor or other motor element may be employed. The spider 18, carrying the record-cylinder, is mounted in the plate or frame 40, and carries a pulley 41, belted to the drive-wheel 42, which is connected by means of pinion 44 and gear 45 to the spring barrel 47.

For the purpose of placing the spring within the barrel 47, under tension, we provide a winding mechanism operated by the handle 2. The stem 2$^a$ is spirally grooved and engages a pin 48 in the sleeve 49, secured to the bevel gear 50, in mesh with the pinion 51, which is sleeved upon the main spring shaft 52. When the handle 2 is pressed down, the gear 50 and pinion 51 will rotate the shaft 52 and wind the main spring, but upon releasing the handle, the stem 2$^a$ will be raised by the spiral spring 54, the spring 55 permitting the pinion 51 to yield as the teeth on the outer end of the sleeve glide over the teeth of the ratchet cap 58 on the end of the shaft 52. The shaft of the spring barrel carries a ratchet 60, which is engaged by the pivoted pawl 61, held in engagement therewith by the spring 62 to regulate the speed of rotation of the barrel and operating mechanism connected therewith.

Instead of using a ratchet clutch between the bevel gears and the shaft of the winding drum as above described, we may fasten the pinion 51 rigidly to the shaft 52, thereby dispensing with the spring 55 and clutch 58. In this case we provide the frame with a depending sleeve 49$^a$ integral with the gear 50 and surrounding the sleeve 49 in the manner shown in Fig. 7. The sleeve 49 in this case is constructed to be free from the gear 50, and may be provided with projecting teeth or lugs 50$^a$ which are adapted to enter depressions or sockets 50$^b$ in the upper edge of the sleeve 49$^a$ to lock the parts together. When the stem 2$^a$ is depressed, the sleeves 49 and 49$^a$ will be locked together, but upon the reverse movement of the stem the sleeve 48 will be lifted slightly and disengaged from the sleeve 49$^a$, so that it will be free to revolve without affecting the gear. It is obvious that other changes may be made and that different devices may be employed to actuate the winding drum.

The operation of the mechanism will be understood from the foregoing description. When the handle 2 is pressed down, the main spring will be wound and will immediately set the record cylinder in operation through the gears and belt pulleys and cause the phonographic reproducer to send out the vocal warning signal such, for instance, as—"danger—look out—automobile coming", or any other appropriate signal which has been recorded upon the cylinder. The signal will be repeated a number of times for each winding of the spring, and unless a speed regulator is attached, the rotary speed of the mechanism will increase rapidly at first and then diminish, thus enhancing the alarming nature of the signal.

Our invention will now be appreciated by reason of the several features which render it of especial value as a warning signal. The vocal warning cry appeals not only to the hearing but instantly to the reason of the pedestrian, while the repetition of the warning call with varying speed causes a startling effect which is most effective. In addition to this, the increased volume and distinctness of the sound waves produced in the sound box by the harmonic vibrations of the sonorous wires, together with the shock-absorbing media which protect the reproducing mechanism from external shocks, render our apparatus most effective for the purposes described.

While we have described in detail the mechanism disclosed in the drawings for the purpose of showing an embodiment of our invention, it will be obvious, as previously pointed out, that many changes may be made therein without departing from the spirit of our invention, and such changes will be within the scope of our claims, which are:—

1. A signal device for automobiles, comprising a casing, a phonographic reproducer and operating mechanism therefor within said casing, shock-absorbing media interposed between said reproducer and operating mechanism and the walls of said casing, said media being maintained normally under compression, socket plates interposed between said media and the casing above said reproducer and mechanism, and adjusting devices operatively connected to said plates.

2. A signal device for automobiles, comprising a casing, a phonographic reproducer and operating mechanism therefor within said casing, a cushioning support constituting an under-base upon which said reproducer and said mechanism are mounted, springs interposed between said under-base and the lower wall of the casing, springs located above said mechanism acting in opposition to said first-named springs, and shock-absorbing media interposed between other walls of said casing and the reproducer and said mechanism.

3. A signal device for automobiles, comprising a casing, a phonographic reproducer and operating mechanism therefor within said casing, shock-absorbing devices interposed between said reproducer and operating mechanism and said casing, said devices being maintained normally under compression, there being corresponding devices above and below the said reproducer and mechanism, and means for adjusting the amount of compression upon said devices.

4. A signal device for vehicles comprising a polygonal casing, a phonographic sound producer therein, actuating mechanism therefor, and shock absorbing means interposed between said sound producer and each side of the casing.

In testimony whereof we have hereunto set our hands in presence of two subscribing witnesses.

ARTHUR W. WASHBURN.
CHARLES D. KEELER.

Witnesses:
W. H. CRAVEN,
M. A. FORD.